United States Patent
Baderdinni

(10) Patent No.: US 9,047,200 B2
(45) Date of Patent: Jun. 2, 2015

(54) DYNAMIC REDUNDANCY MAPPING OF CACHE DATA IN FLASH-BASED CACHING SYSTEMS

(71) Applicant: LSI Corporation, Milpitas, CA (US)

(72) Inventor: Anant Baderdinni, Lawrenceville, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 302 days.

(21) Appl. No.: 13/624,463

(22) Filed: Sep. 21, 2012

(65) Prior Publication Data

US 2014/0089558 A1    Mar. 27, 2014

(51) Int. Cl.
*G06F 12/02*    (2006.01)
*G06F 12/08*    (2006.01)

(52) U.S. Cl.
CPC ...... *G06F 12/0871* (2013.01); *G06F 2212/222* (2013.01); *G06F 2212/286* (2013.01); *G06F 2212/403* (2013.01); *G06F 2212/7208* (2013.01)

(58) Field of Classification Search
CPC ............ G06F 12/0846; G06F 12/0623; G06F 12/0848; G06F 12/0855; G06F 12/0877; G06F 12/08; G06F 2212/222; G06F 11/2056; G06F 2212/1044; G06F 2212/286; G06F 2212/261
USPC .................................. 711/113, 118
See application file for complete search history.

(56) References Cited

U.S. PATENT DOCUMENTS

| | | | | |
|---|---|---|---|---|
| 5,586,291 A * | 12/1996 | Lasker et al. | ......... | 711/113 |
| 6,279,078 B1 * | 8/2001 | Sicola et al. | ......... | 711/119 |
| 7,636,814 B1 * | 12/2009 | Karr et al. | ......... | 711/143 |
| 7,752,173 B1 * | 7/2010 | Gole | ......... | 707/654 |
| 7,958,304 B1 * | 6/2011 | Goel et al. | ......... | 711/114 |
| 2003/0188097 A1 * | 10/2003 | Holland et al. | ......... | 711/114 |
| 2007/0180295 A1 * | 8/2007 | Byrne et al. | ......... | 714/6 |
| 2008/0172531 A1 * | 7/2008 | Liu et al. | ......... | 711/135 |
| 2009/0265507 A1 * | 10/2009 | Jibbe et al. | ......... | 711/103 |
| 2010/0100664 A1 * | 4/2010 | Shimozono | ......... | 711/103 |
| 2010/0174863 A1 * | 7/2010 | Cooper et al. | ......... | 711/113 |
| 2010/0191907 A1 * | 7/2010 | Ish | ......... | 711/114 |
| 2010/0199039 A1 * | 8/2010 | Bauman et al. | ......... | 711/114 |
| 2011/0022801 A1 * | 1/2011 | Flynn | ......... | 711/120 |
| 2011/0238912 A1 * | 9/2011 | Shuster | ......... | 711/114 |
| 2011/0258391 A1 * | 10/2011 | Atkisson et al. | ......... | 711/118 |
| 2013/0191601 A1 * | 7/2013 | Peterson et al. | ......... | 711/137 |
| 2013/0198448 A1 * | 8/2013 | Ish et al. | ......... | 711/113 |

* cited by examiner

*Primary Examiner* — Aimee Li
*Assistant Examiner* — Alex Olson
(74) *Attorney, Agent, or Firm* — Suiter Swantz pc llo

(57) ABSTRACT

A method for managing redundancy of data in a solid-state cache system including at least three solid-state storage modules. The method may include designating one or more extents of each dirty mirror pair to be of a particular priority order of at least two priority orders. The at least two priority orders can include at least a highest priority order. The highest priority order can have a higher relative priority than the other priority orders. The method may also include performing at least one redundancy conversion iteration. Each redundancy conversion iteration includes converting extents of at least two dirty mirror pairs into at least one RAID 5 group and at least one unconverted extent. The extents of the at least two dirty mirror pairs can include extents designated to be of a highest remaining priority order. Each redundancy conversion iteration can also include deallocating the at least one unconverted extent.

20 Claims, 4 Drawing Sheets

DYNAMIC REDUNDANCY MAPPING OF CACHE DATA IN FLASH-BASED CACHING SYSTEMS

CROSS-REFERENCE TO RELATED APPLICATIONS

The present application incorporates herein by reference U.S. patent application Ser. No. 13/362,099, filed Jan. 31, 2012, entitled "ELASTIC CACHE OF REDUNDANT CACHE DATA".

FIELD OF THE INVENTION

The present invention is directed generally toward a method and apparatus for managing redundancy of data in a flash-based cache system having at least three flash modules.

BACKGROUND OF THE INVENTION

In storage systems, overall system and/or application performance is improved by caching the data that is frequently accessed (i.e., "hot data") on faster and more capable drives or media such as solid state drives (SSDs) or Peripheral Component Interconnect (PCI) or PCI express flash memory (such as NOR or NAND flash memory). Many application workloads benefit and provide improved performance if cache is used in write back mode. Because cache data is held in write back mode longer, the cache needs to be protected against data loss by providing redundancy. For example, if a controller has a cache system with two storage modules, then redundancy would need to be provided to the cache system to protect against data loss. Currently, for example, some cache systems with two flash modules utilize RAID level 1 ("Redundant Array of Independent Disks" level 1) pairs for the cache system to mirror the cache data of each flash module to the other flash module. However, the use of RAID 1 mirroring in a two-module flash-based cache system effectively reduces data capacity of the two-module cache-system to an equivalent of one module.

Currently, there are no mechanisms for improving data capacity of cache systems while providing the necessary redundancy in the event of a system failure, hardware failure, power loss, or the like.

Therefore, it may be desirable to provide a method and apparatus which address the above-referenced problems.

SUMMARY OF THE INVENTION

Accordingly, a method is included for managing redundancy of data in a solid-state cache system, wherein the solid-state cache system includes at least three solid-state storage modules. The method may include designating one or more extents of each dirty mirror pair to be of a particular priority order of at least two priority orders. The at least two priority orders includes at least a highest priority order, whereby the highest priority order has a higher relative priority than any other priority order of the at least two priority orders. The method may also include performing at least one redundancy conversion iteration. Each of the at least one redundancy conversion iteration includes converting extents of at least two dirty mirror pairs into at least one RAID 5 group and at least one unconverted extent. The extents of the at least two dirty mirror pairs can include extents designated to be of a highest remaining priority order. Each of the at least one redundancy conversion iteration can also include deallocating the at least one unconverted extent.

Additionally, a controller of a solid-state cache system having at least three solid-state storage modules is included. The controller can be configured to perform the method for managing redundancy of data in a solid-state cache system.

Further, an embodiment can include a solid-state cache system. The solid-state cache system can include at least three solid-state storage modules and a controller. The controller can be configured to perform the method for managing redundancy of data in a solid-state cache system.

It is to be understood that both the foregoing general description and the following detailed description are exemplary and explanatory only and are not restrictive of the invention claimed. The accompanying drawings, which are incorporated in and constitute a part of the specification, illustrate embodiments of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Figure 1:
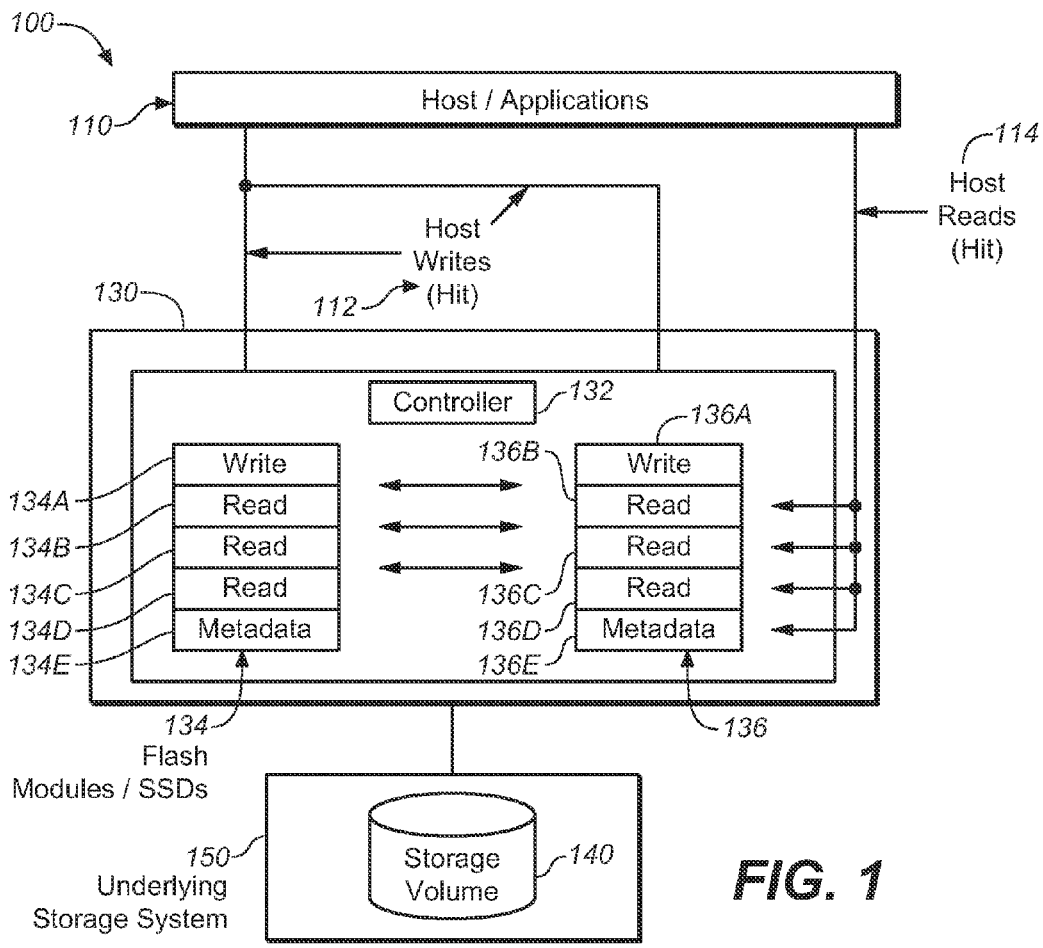
FIG. 1 shows a diagram of cache and extent organization of a system topology.

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention may include a method for statically or dynamically converting a RAID 1 (or an elastic RAID 1) organization of cache data of a cache system to a RAID 5 organization of the cache data of the cache system. An elastic RAID 1 organization of cache data of a cache system provides benefit over a straight RAID 1 organization because the elastic RAID 1 organization only creates mirror pairs for dirty extents; whereas a straight RAID 1 organization creates mirror pairs for all extents. An extent represents a collection of sequential blocks of data, treated as one unit for the purposes of allocating, deallocating, tracking, and managing data. Dirty extents of the cache system are extents of the cache system that include dirty data. Dirty data is cache data that has been modified but not yet written back to the underlying storage media. Because dirty data of a cache system has not yet been written to the underlying storage media, the dirty cache data or dirty cache extents require protection from data loss through redundancy implemented on the cache system. Elastic RAID configurations may be used for cache systems because much of the cache data of cache systems is already stored (and/or redundantly stored) in the underlying non-volatile storage media; only the dirty data of cache needs to be stored with redundancy.

Non-volatile or solid state storage-based cache systems can include SSDs, flash memory (such as PCI express flash memory (e.g., NOR or NAND flash memory)), memristors, or the like.

Embodiments of the present invention include methods for increasing the effective capacity of a cache system by dynamically converting the cache system from an elastic RAID 1 organization of cache data to a RAID 5 organization. Following the dynamic conversion from a RAID 1 organization to a RAID 5 organization, the RAID 5 organization of cache data will require less space to maintain redundancy on the cache system. As a result of the freed up cache space, the cache system can effectively improve the speed of the overall system by increasing the amount of hot data that can be cached.

Embodiments of this disclosure include methods to dynamically map the redundancy of data from a RAID 1 subsystem to a RAID 5 subsystem, wherein the subsystem includes three or more storage modules (such as three or more solid state storage modules (e.g., flash modules, memristor modules, or the like)) available for cache storage. Depending on a read/write mix of data going to cache, converting to the RAID 5 organization of the cache system can provide additional cache space over a prior RAID 1 organization of the cache system. This additional cache space can provide better cache coverage for the same cache investment (as caching media is expensive); thus, servers which may have expanding frequently accessed data can take advantage of the additional cache resources. Additionally, embodiments for converting to the RAID 5 organization may use and/or build upon most of the extent and metadata management infrastructure of the prior elastic RAID 1 organization. Moreover, the conversion from RAID 1 to RAID 5 may be dynamically performed as a background operation or process to minimize resources (such as to minimize overhead input/output operations per second (IOPS)). Furthermore, embodiments may reduce RAID 5 read-modify-write (RMW) penalties incurred from caching parity extents and by performing prioritized flushing of cache extents to the underlying storage volume.

Referring to FIG. 1, cache and extent organization of a solid state storage-based cache system 120 is depicted within a system topology 100. A host/applications 110 may include a host system, applications running on the host system, or applications running on one or more computing devices communicatively coupled to the system topology 100. The host/applications 110 may be communicatively coupled to a cache system 120, a controller 132, and a storage volume 140. The host/applications 110 may send read 114 and write 112 I/O ("input/output") requests to a cache system 120, a storage volume 140, and/or a controller 132.

The cache system may include one or more cache volumes 130. Each cache volume may include one or more storage modules 134, 136 and a controller 132. For example, FIG. 1 depicts the cache volume 130 as having two storage modules 134, 136; however, other implementations may include a cache volume as having any number of storage modules 134, 136.

The storage modules 134, 136 may comprise solid-state storage modules (such as flash memory modules, SSD modules, or memristor modules) such that the cache system 120 comprises a solid-state cache system. The cache system 120 or the cache volume 130 of the cache system 120 may include a controller 132.

The controller 132 may be implemented as a processing module in software, firmware, or hardware located on a particular cache volume (e.g., 130) or on the cache system 120. For example, the controller 132 may be implemented as a processing module of an acceleration card having a PCIe interface. In some implementations, the controller 132 may be included elsewhere in the system topology 100, such as being located as a stand-alone controller communicatively coupled between the host/applications 100 and the cache system 120 or as being the controller 132 of a multi-volume cache system 120, which has two or more cache volumes. The controller 132 may be configured to send, direct, or route write data to a storage volume 140 of an underlying storage system 150; or receive read data from the storage volume 140; control parity among the storage modules 134, 136; flush data from the storage modules 134, 136; and allocate, deallocate, track, and/or manage data of the storage modules 134, 136, cache volume 130, or cache system 130.

The underlying storage system 150 may include one or more storage volumes, such as storage volume 140. Each storage volume 140 may include one or more non-volatile storage devices such as at least one HDD, at least one SSD, or the like.

Still referring to FIG. 1, each of the storage modules 134, 136 may be organized into extents 134A-D, 136A-D and metadata 134E, 136E. Each extent represents a collection of sequential blocks of data, treated as one unit for the purposes of allocating, deallocating, tracking, and/or managing data. For example, the storage module 134 may be partitioned or organized into one or more read extents 134B-D, one or more write extents 134A, and metadata 134E. Similarly, for example, the storage module 136 may be partitioned or organized into one or more read extents 136B-D, one or more write extents 136A, and metadata 136E. Furthermore, the storage modules 134, 136 may be configured and organized in a RAID 1 configuration such that the extents of each storage module are mirrored on extents of the other storage module.

For example, if the cache system 120 of FIG. 1 were organized in a currently used straight RAID 1 configuration, each extent would be mirrored across both mirror pairs. Under the straight RAID 1 configuration, some of the extents carry dirty data, i.e., data that has not been committed to the storage volume 140, and other extents carry data cached from the storage volume 140 based on an underlying caching criteria.

However, only the cache extents with dirty data need redundancy protection because the non-dirty extents (e.g., extents which carry cache reads) can be repopulated from the storage volume 140 of the underlying storage system 150 without causing loss of data. Therefore, a method for implementing an elastic cache offers an improvement for effective use of flash space over the straight RAID 1 cache configuration because the elastic cache configuration only maintains mirror pairs for extents with dirty data.

Figure 2:
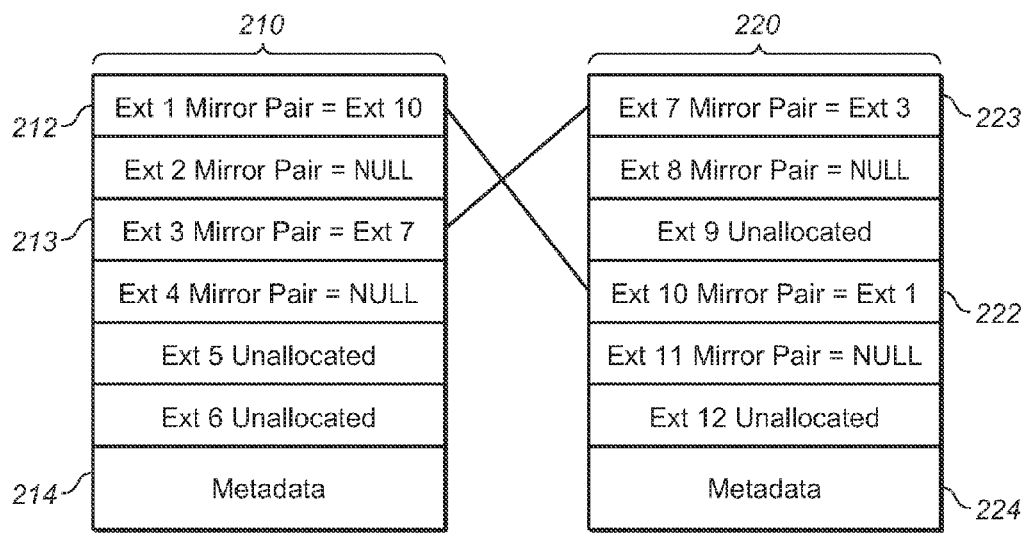
FIG. 2 shows a diagram of cache and extent organization implemented as a RAID 1 elastic cache.

Referring to FIG. 2, an elastic cache organization of two storage modules 210, 220 is shown. Each of the two storage modules 210, 220 may be organized into extents and metadata 214, 224. Most of the existing extent and metadata organization used in a straight RAID 1 cache organization with mirror pairs can be used in an elastic RAID cache organization because for every host I/O request (e.g., 112, 114), the LBAs (logical block addresses) are mapped to extents to locate the correct extent in order to serve the host requests (e.g., 112, 114). However, the extents and metadata of a straight RAID 1 cache organization need to be modified slightly for elastic cache organization.

The modifications required for elastic cache organization modifications can include adding or creating one or more fields to or for each extent. The one or more fields for each extent may include information associated with the extent's mirror pair. The information associated with the extent's mirror pair, which is included in one or more fields of the extent, can include identifying information, location information, and/or the like. For example, a particular extent's field may include a mirror extent location field and a mirror extent identification field; the mirror extent location field can include information such as in what cache module and/or cache volume the mirror extent is located, and the mirror extent identification field can include information such as the extent number of the mirror extent. The one or more fields can be used to track the extent's mirror pair extent. The ability to track the mirror pair's extent allows the elastic RAID organization to change the physical location of an extent's mirror extent or to flush data from a mirror extent without flushing data from the extent. Similarly, the metadata 214, 224 can be modified, changed, or updated to account for, incorporate, and/or reflect the one or more added fields for each extent.

For an elastic RAID 1 cache, when data from the host 110 needs to be written to the cache volume 130, two extents may be allocated such that each extent of a mirror pair is on a different storage module 210, 220, and the corresponding fields of each extent may be updated to point to each other as an extent mirror pair.

Still referring to the elastic RAID 1 cache system having two storage modules 210, 220 of FIG. 2, each extent that is "dirty" will have one mirror pair extent on a separate flash module. The storage modules 210, 220 may include dirty extents 212, 213, 222, and 223 with write data that has not been written or flushed to the underlying storage. In the elastic RAID 1 cache organization as shown in FIG. 2, only dirty extents 212, 213, 222, 223 have mirror pairs. FIG. 2 shows that dirty extents 212 and 222 are mirror pairs and that the dirty extents 213 and 223 are mirror pairs. A field of each dirty extent includes a pointer to the other mirror pair extent. For example, the dirty extent 212 of the storage module 210 (i.e., "Ext 1 Mirror Pair") is mirrored on the other storage module 220 as "Ext 10 Mirror Pair". Both of the mirror pair extents 212, 222 include fields with a pointer to the corresponding mirror pair, such as "Ext 1 Mirror Pair=Ext 10" and "Ext 10 Mirror Pair=Ext 1". Furthermore, Ext 2, Ext 4-6, Ext 8, Ext 9, and Ext 12 are not mirrored on the other storage module because they do not contain dirty data; the pointers of the fields can be set to point to "NULL", "Unallocated", or the like. Likewise, corresponding changes are made to the metadata 214, 224 to reflect the "NULL" or "Unallocated" pointers for the non-dirty or unallocated extents.

When data from the host 110 needs to be written to the cache volume 130, two extents may be allocated such that each extent is on a different storage module 210, 220, and the corresponding fields of each extent may be updated to point to each other as an extent pair. When a dirty extent is flushed (i.e., written) to the storage volume 140, one of the mirror pairs corresponding to the two extents can be unallocated, and the remaining single extent's mirror pair is marked as "NULL" or "Unallocated" to make space for further cache allocation. Likewise, corresponding changes can be made to the metadata 214, 224 to reflect the "NULL" or "Unallocated" pointers for the unallocated extents.

Additionally, in an elastic cache organization, when a host's 110 read I/O request results in a read miss and the cache needs to be populated with read data, a single extent can be allocated for the read data; and the single extent's mirror pair is marked as "invalid" or "null", as shown in FIG. 2. The unused mirror pair extents can be freed up for additional caching.

Under the circumstances that one of the storage modules 210, 220 fails, one or more algorithmic methods may be performed to preserve and maintain the redundancy of dirty cache data. Performance of the algorithmic method may depend or vary based upon the number of cache modules, programmable settings, user defined settings, or the like. Implementations of the algorithmic method may include accessing and/or scanning the metadata of the cache system to determine the surviving dirty extents. In some cache system implementations, the surviving dirty extents may be immediately flushed to the underlying storage. Upon flushing the surviving dirty extents, the method may include determining the remaining extents of the surviving cache to be non-dirty. The method may include determining from the metadata the extents which did not survive, and repopulating the surviving storage module (or storage modules) with the read and/or non-dirty write data from the underlying storage. Additionally, the algorithm may include suspending or ceasing all caching of dirty data until a redundant cache system is reimplemented, such as by replacing the failed storage module with a functional storage module. In other implementations, such as where a cache system 120 or cache volume 130 includes three or more cache modules, the method may include creating parity extents or mirror pair extents on a surviving cache module for each extent that lost parity due to a cache module failure.

Figure 3:
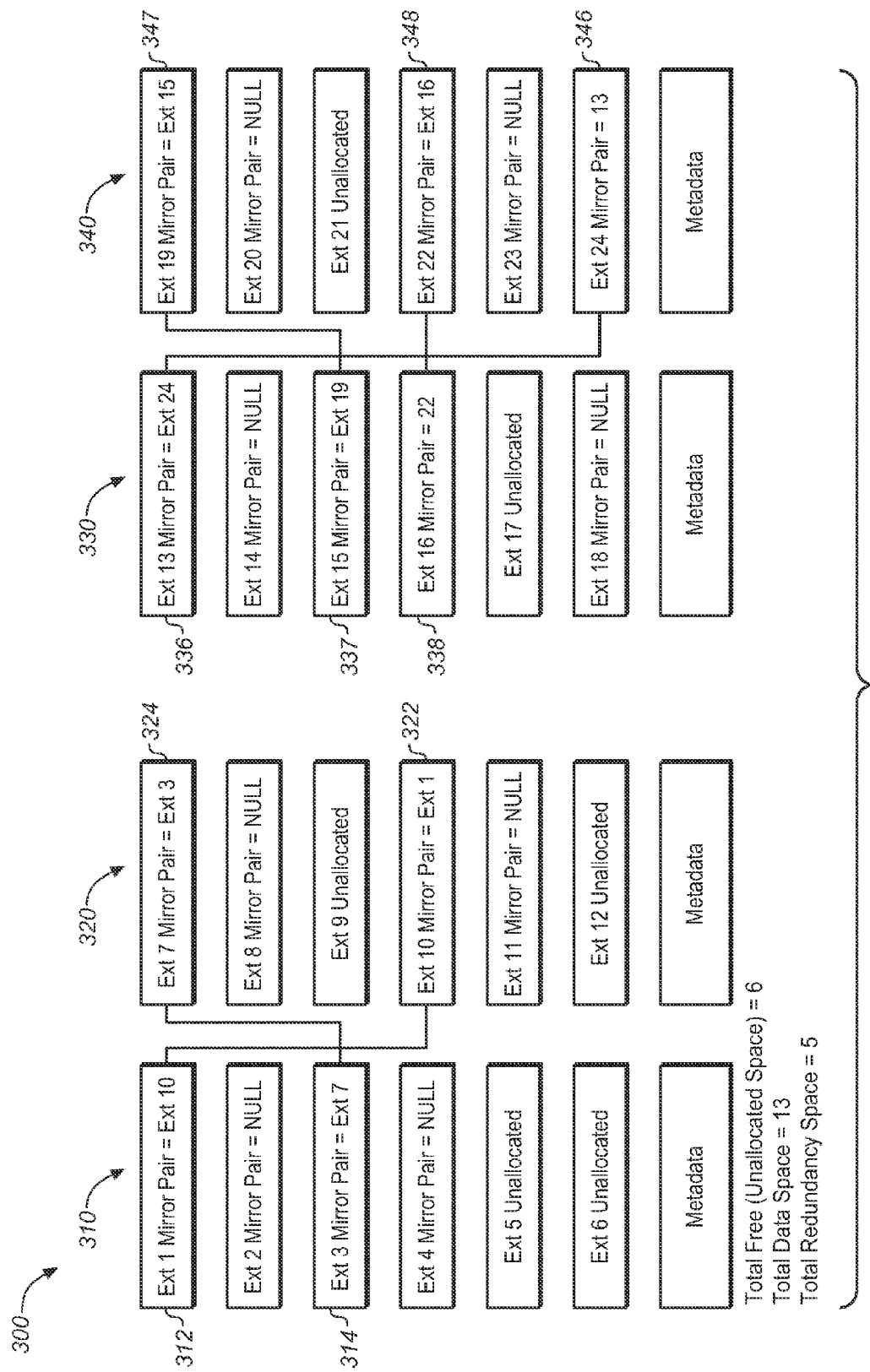
FIG. 3 shows a layout of storage modules of a cache system organized as a RAID 1 elastic cache.

Referring to FIG. 3, a diagram of a cache system 300 organized as a RAID 1 elastic cache system 300 having four storage modules 310, 320, 330, 340 is depicted. As similarly described for FIGS. 1 and 2, each storage module 310, 320, 330, 340 includes one or more extents and metadata. The extents of the elastic cache system 300 may include dirty extents, non-dirty write extents, read extents, or unallocated extents.

As shown in FIG. 3, the cache system 300 has a total storage space of 24 extents. The cache system 300 includes six unallocated extents (i.e., free space) and 18 allocated extents. The 18 allocated extents comprise a data space of 13 extents and a redundancy space of five extents. The cache system 300 includes five mirror pairs of dirty extents. That is, dirty extents 312, 314, 336, 337, and 338 are mirror pairs with extents 322, 324, 346, 347, and 348, respectively; the five mirror pairs of dirty extents require a storage space of ten extents, which includes a data space of five extents (e.g., 312, 314, 336, 337, and 338) and a redundancy space of five extents (e.g., 322, 324, 346, 347, and 348).

Pursuant to the elastic RAID 1 cache organization of FIG. 3, the amount of cache space utilized for redundancy protection is equal to the amount of "dirty" data sitting within the cache. For example, in a flash-based elastic RAID 1 cache, if one-fourth of the flash space is dirty, then one-fourth of the flash space has to be utilized for redundancy; this example results in only one-half of the flash space available for cache read data. However, if a RAID 5 type of protection is implemented instead of the elastic RAID 1 cache organization, the penalty on redundant data can be significantly reduced. A RAID 5 cache implementation, though, generally incurs more read-modify-write (RMW) penalties which can result in performance problems due to more reads and writes being required as compared to typical RAID 1 RMW implementations.

Embodiments of the invention include dynamically converting two or more RAID 1 mirror pairs of a solid-state cache system having three or more solid-state storage modules into one or more RAID 5 groups. This allows more cache extents to be free as a result of each conversion or conversion iteration while also implementing techniques to reduce RMW penalties.

Figure 4:
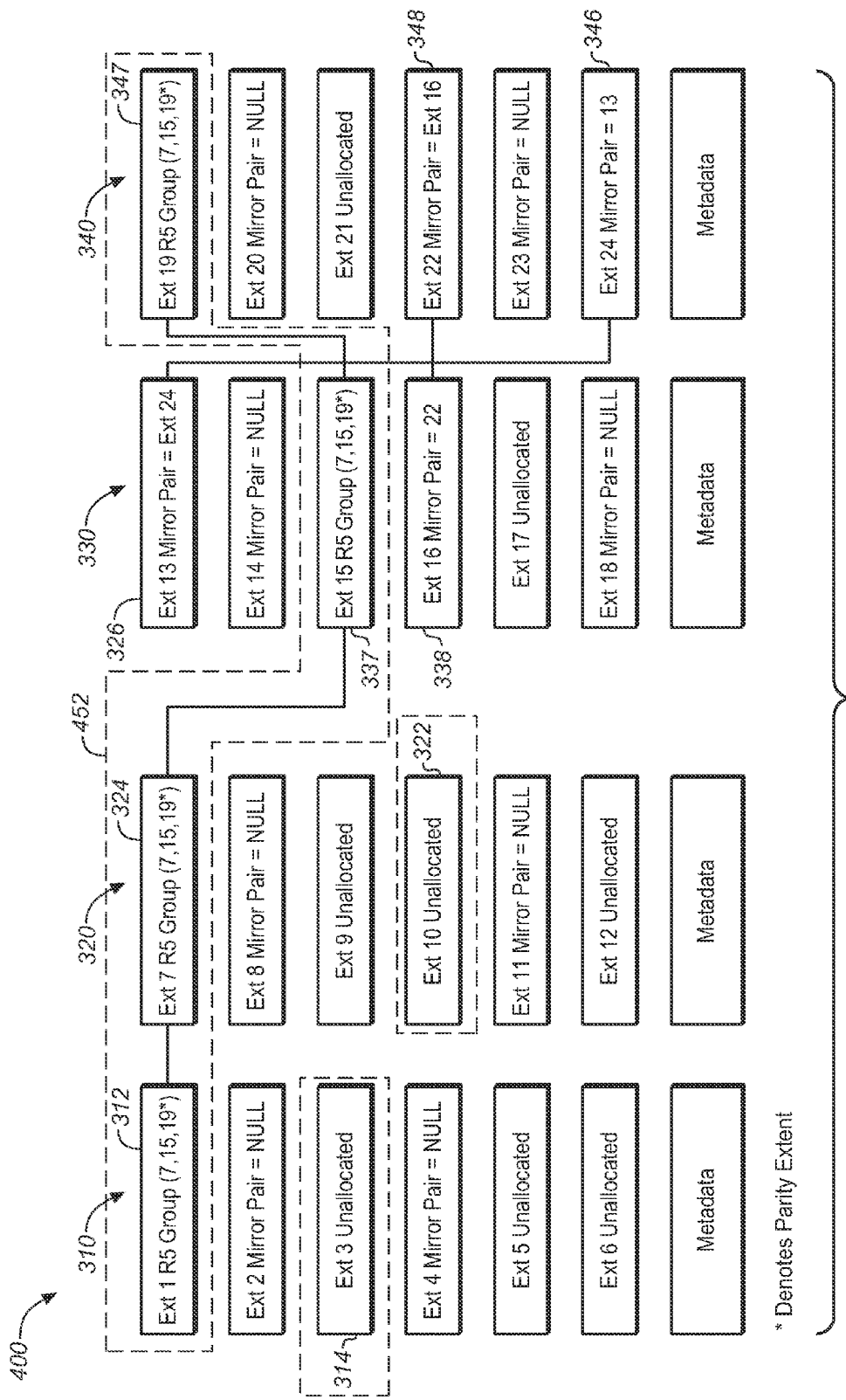
FIG. 4 shows a layout of flash modules of FIG. 3 after a conversion of the RAID 1 elastic cache to a RAID 5 elastic cache.

FIG. 4 depicts a cache system 400 organized as an elastic cache having four storage modules 310, 320, 330, 340, wherein one level or iteration of RAID 1 to RAID 5 conversion has been performed on the RAID 1 elastic cache organization of cache system 300 of FIG. 3 into the elastic cache organization of the cache system 400.

The iteration of RAID 1 to RAID 5 conversion (which is resultantly depicted in FIG. 4) includes converting three RAID 1 mirror pair extents 312/322, 314/324, and 337/347 (as shown in FIG. 3) into a RAID 5 group 452. The RAID 5 group 452 includes extents 312, 324, 337, and a parity extent 347 as shown in FIG. 4. As resultantly shown in the cache system of FIG. 4, this iteration of RAID 1 to RAID 5 conversion results in three RAID 1 mirror pairs 312/322, 314/324, 337/347 (of the five RAID 1 mirror pairs shown in the cache system 300) being converted into the RAID 5 group 452 with the retention of two RAID 1 mirror pairs 338/348, 336/346 (of the five RAID 1 mirror pairs shown in the cache system 300).

Referring still to FIG. 4, the iteration of the RAID 1 to RAID 5 conversion may be managed or controlled by a controller 132 performing one or more algorithmic methods, such as an algorithmic dynamic redundancy conversion method, an algorithmic prioritized flushing method, and/or the like. The performance of the algorithmic dynamic redundancy conversion method by the controller 132 can include determining which of the five mirror pairs to convert into the RAID 5 group 452, determining when to perform a conversion iteration, and/or the like. Additionally, performance of the algorithmic prioritized flushing method by the controller 132 may include determining an order to flush extents, determining when to flush extents, and/or the like.

As a result of this RAID 1 to RAID 5 conversion, two extents 314, 322 are deallocated, and thus, the total free space has been increased by two extents 314, 322. The cache system 400 still has a total storage space of 24 extents; however, the cache system 400 now includes eight unallocated extents (i.e., free space) and 16 allocated extents. The 16 allocated extents still represent a data space of 13 extents, but now the redundancy space only includes three extents. The cache system 400 now includes the RAID 5 group 452 (which spans four extents) and two mirror pairs 336/348, 338/348. Cache system 400's organization provides two additional extents of free space over the cache system 300's elastic RAID 1 organization.

Embodiments of the invention may further include a method to dynamically map and/or convert the redundancy of data from an elastic RAID 1 cache system (e.g., 300) to a RAID 5 cache system (e.g., 400). The methods for dynamically mapping and/or converting the redundancy of data from an elastic RAID 1 cache system (e.g., 300) to a RAID 5 cache system (e.g., 400) may be implemented on cache systems which include at least three solid-state storage modules.

The method to dynamically map and convert the redundancy of data form an elastic RAID 1 cache system (e.g., 300) to a RAID 5 cache system (e.g., 400) can be performed dynamically as a background operation (e.g., as a background process or process operating during idle states) so as to reduce or minimize overhead IOPS. Depending on the read/write proportion of the data written to cache or residing in cache, the method of dynamically converting or mapping can provide improved cache coverage without requiring additional cache storage.

Because operating a RAID 5 cache system results in or incurs more RMW penalties than operating a RAID 1 cache system, the method to dynamically map and convert the redundancy of data from an elastic RAID 1 cache system to a RAID 5 cache system may be initiated upon determining that a lower threshold of unallocated cache space has been reached. Additionally, the performance of dynamically mapping and converting may be performed in levels, stages, or iterations, such that during one particular level, stage, or iteration, some RAID 1 mirror pairs are converted into one or more RAID 5 groups such that one or more subsequent conversion iterations may still be performed. That is, wherein one iteration of RAID 1 to RAID 5 conversion is performed, subsequent iterations may be repeated so long as unallocated cache space is greater than the lower threshold of unallocated cache space and so long as the cache has at least two RAID 1 mirror pairs.

The lower threshold of unallocated cache space may be predetermined, preprogrammed, programmable, variable, or the like. For example, the lower threshold of unallocated cache space may be predetermined or preprogrammed and implemented through firmware of the cache system. Additionally, the lower threshold of unallocated cache space may be programmable by a user, firmware process, host system process, application, or the like. A variable lower threshold of unallocated cache space may be based upon one or more cache system characteristics or metrics, one or more system characteristics or metrics, one or more storage characteristics or metrics, or the like. Metrics may, include for example, read/write ratio of host I/O requests, ratio of cache read speed to storage volume read speed, ratio of cache write speed to storage volume write speed, or the like. Furthermore, the lower threshold of unallocated cache space may be based upon a caching policy. Additionally, embodiments of this invention may be implemented by calculating and monitoring optimal or near-optimal variable lower threshold values of unallocated cache space based upon one or more system characteristics; that is, cache system performance may be optimized based upon the inputs of the one or more system characteristics and the RMW penalties associated with performance of one or more RAID 1 to RAID 5 conversion iterations.

Embodiments of the invention may include a method for performing one or more RAID 1 to RAID 5 conversion iterations once the lower threshold level of unallocated space is reached. The method can provide a mechanism to manage redundancy at the extent level so overall cache space can be utilized more effectively. This method can be optimized such that performing one or more RAID 1 to RAID 5 conversion iterations reduces read latency on contiguous blocks that span two or more extents. This method can also be optimized such that performing one or more RAID 1 to RAID 5 conversion iterations minimizes writes to parity.

This method includes scanning the extents to locate groups of extents to be pooled into prioritized pools of extents. This method includes locating extents that represent contiguous blocks of data and combining the extents which represent contiguous blocks of data into a pool of RAID 5 groups. The method includes assigning the pool of RAID 5 groups as having first order priority. This method further includes locating extents that represent maximum overlap in terms of dirty data and then combining the extents having maximum overlap of dirty data into a pool. The method includes assigning a second order priority to the pool of extents having maximum overlap of dirty data. The method may also include assigning a last order priority to all other extents.

The method may also include accumulating parity for one or more particular mirror pairs or parity extents until a write operation needs to update one of the one or more particular mirror pairs or parity extents. Accumulating parity and waiting to perform parity writes minimizes parity and mirror write penalties for parity updates by performing the typically separate parity write concurrently with the update write to the mirror pair or parity extent.

Embodiments of the method may include caching one or more parity extents in a faster memory type (such as DDR random access memory (RAM) or the like). The caching of one or more parity extents may be prioritized for one or more particular parity extents based upon an activity prioritized least recently used (LRU) order. Furthermore, when the faster memory type includes a volatile storage medium (such as DDR RAM or the like), caching one or more parity extents in the faster memory type may be in addition to maintaining the parity extent in a solid-state storage module of the cache system 120. Caching each parity extent in a faster memory type can allow any further updates to RAID 5 groups to be performed faster so as to reduce the occurrence of reading of old parity before or during the generation of updated parity data of the parity extent.

Additionally, the method may include uniformly distributing parity extents in a manner similar to a traditional RAID 5 organization.

Embodiments of the invention may further include a method for flushing extents to a storage volume in a prioritized order configured to maximize the benefit of RAID 5 extents and to minimize RMW penalties. Each flush of a RAID 5 group or a RAID 1 mirror pair will maintain allocation of the data space extents but will deallocate the parity extent or the mirror pair extent so as to make the parity extent or mirror pair extent unallocated, which increases free space in the cache. The method may include selecting extent groups in a prioritized order to be flushed because each flush cycle may not be able to flush all extents in that particular flush cycle.

The method for flushing extents in a prioritized order may include first flushing RAID 5 groups receiving the most frequent RMW updates. The method may include secondly flushing RAID 1 pairs. The method may include lastly flushing all remaining RAID 5 groups. Performance of each prioritized flushing will retain the data in the allocated cache but deallocate the corresponding parity extent or mirror pair.

Figure 5:
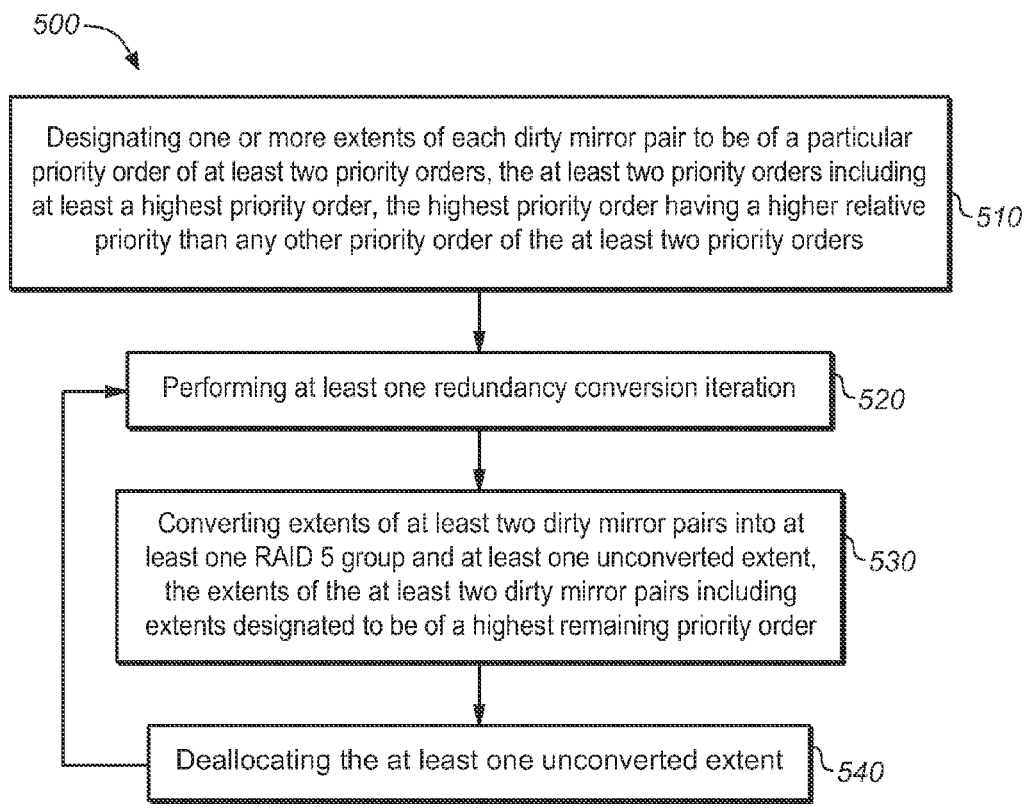
FIG. 5 shows a method for managing redundancy of data in solid-state cache system.

Referring to FIG. 5, an embodied method 500 associated with managing redundancy of data in a solid-state cache system with at least three solid-state storage modules is depicted. The at least three solid-state storage modules may comprise at least three flash modules. It is contemplated that embodiments of the method 500 may be performed by a controller of the solid-state cache system, software or firmware executed on a computing device (such as a processor), other computing devices, other computer components, or on other software, firmware, or middleware. The method 500 may include any or all of steps 510, 520, 530, or 540, and it is contemplated that the method 500 may include additional steps as disclosed throughout, but not explicitly set forth in this paragraph. Further, it is fully contemplated that the steps of method 500 may be performed concurrently or in a non-sequential order.

Some implementations of the method 500 may include, prior to the performance of the step 510, configuring the redundancy organization of the solid-state cache system as an elastic RAID 1 organization such that redundancy is implemented only for dirty write data through RAID 1 mirror pairs, and this may include adding a field to each extent.

The method 500 may include a step 510, wherein the step 510 may include designating one or more extents of each dirty mirror pair to be of a particular priority order of at least two priority orders. The at least two priority orders can include at least a highest priority order, whereby the highest priority order has a higher relative priority than any other priority order of the at least two priority orders. The step 510 may include designating one or more extents of a particular dirty mirror pair to be of the highest priority order based upon the one or more extents of the particular dirty mirror pair having a block of data contiguous to a block of data of one or more extents of another dirty mirror pair. Additionally, designating one or more extents of a second particular dirty mirror pair to be of a second highest priority order may be based upon the second particular dirty mirror pair having an overlap of dirty data with another dirty mirror pair. All other dirty mirror pairs may be designated as being of a lowest priority order. The method 500 may further include storing designated priority orders in metadata of the solid-state cache system.

The method 500 may include a step 520, wherein the step 520 may include performing at least one redundancy conversion iteration. Each particular iteration of the at least one redundancy conversion iteration may further include steps 530 and 540.

The step 520 of the method 500 may include a step 530, wherein the step 530 may include converting extents of at least two dirty mirror pairs into at least one RAID 5 group and at least one unconverted extent. The extents of the at least two dirty mirror pairs can include extents designated to be of a highest remaining priority order. In some implementations the step 530, may be performed upon determining an amount of unallocated space of the solid-state cache system to be less than or equal to a lower threshold of unallocated space. Some implementations may further include determining the lower threshold of unallocated space.

The step 520 of the method 500 may include a step 540, wherein the step 540 may include deallocating the at least one unconverted extent.

The method 500 may also include updating the designated priority orders stored in metadata of the solid-state cache system upon performing a redundancy conversion iteration.

The method 500 may include additional steps, which are not depicted in FIG. 5. For example, the method 500 may include scanning extents of the at least three solid-state storage modules. The method 500 may also include flushing all non-dirty RAID mirror pairs or non-dirty RAID groups of the solid-state cache system.

The method 500 may also include accumulating one or more writes to a parity extent of a dirty mirror pair until a new write operation needs to update a data extent of the dirty mirror pair; likewise, the method 500 may include performing at least one or more writes to the parity extent of the dirty mirror pair upon performing a new write operation to update the data extent of the dirty mirror pair.

The method 500 may also include performing flush operations in a prioritized order. Each flush operation can include retaining data in the allocated cache and deallocating a parity extent or a mirror pair corresponding to the data in the allocated cache. The prioritized order for performing flush operations may include first flushing RAID 5 groups with a frequency of read-modify-write updates greater than a predetermined frequency. Then, the prioritized order of flushing operations may include flushing dirty mirror pairs. Subsequently, the priority order of flushing operations may include flushing remaining RAID 5 groups.

Furthermore, one of ordinary skill in the art would readily understand and appreciate that embodiments of the invention may further be useful for improving storage aggregation (whereby portions of data may be mirrored on separate physical devices), policy selection mechanisms (whereby whether the cache data of a particular storage device is mirrored is based upon a predetermined or programmable policy), or the like.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for managing redundancy of data in a solid-state cache system, the solid-state cache system including at least three solid-state storage modules, the method comprising:
designating one or more extents of each dirty mirror pair to be of a particular priority order of at least two priority orders, the at least two priority orders including at least a highest priority order, the highest priority order having a higher relative priority than any other priority order of the at least two priority orders, wherein extents of each dirty mirror pair are stored on different solid-state storage modules of the at least three solid-state storage modules of the solid-state cache system; and
performing at least one redundancy conversion iteration, wherein performing a particular iteration of the at least one redundancy conversion iteration includes:
converting extents of at least two dirty mirror pairs stored on different solid-state storage modules of the at least three solid-state storage modules into at least one redundant array of independent disks (RAID) 5 group and at least one unconverted extent, the extents of the at least two dirty mirror pairs including extents designated to be of a highest remaining priority order, wherein the RAID 5 group is stored across three or more different solid-state storage modules of the at least three solid-state storage modules; and
deallocating the at least one unconverted extent into at least one unallocated extent, wherein the at least one unallocated extent is available for further caching.

2. The method of claim 1, wherein the at least three solid-state storage modules comprise at least three flash modules.

3. The method of claim 1, further comprising:
before designating one or more extents of each dirty mirror pair to be of a particular priority order of at least two priority orders, configuring the redundancy organization of the solid-state cache system as an elastic RAID 1 organization such that redundancy is implemented only for dirty write data through RAID 1 mirror pairs.

4. The method of claim 1, further comprising:
before designating one or more extents of each dirty mirror pair to be of a particular priority order of at least two priority orders, configuring the redundancy organization of the solid-state cache system as an elastic RAID 1 organization such that redundancy is implemented only for dirty write data through RAID 1 mirror pairs, wherein configuring the redundancy organization of the solid-state cache system as the elastic RAID 1 organization further includes adding a field to each extent.

5. The method of claim 1, further comprising:
scanning extents of the at least three solid-state storage modules.

6. The method of claim 1, further comprising:
flushing all non-dirty RAID mirror pairs or non-dirty RAID groups of the solid-state cache system.

7. The method of claim 1, further comprising:
determining an amount of unallocated space of the solid-state cache system to be less than or equal to a lower threshold of unallocated space, and
wherein performing a particular iteration of at least one redundancy conversion iteration comprises performing the particular iteration of the at least one redundancy conversion iteration upon determining the amount of unallocated space of the solid-state cache system to be less than or equal to the lower threshold of unallocated space.

8. The method of claim 1, further comprising:
determining a lower threshold of unallocated space of the solid-state cache system; and
determining an amount of unallocated space of the solid-state cache system to be less than or equal to a lower threshold of unallocated space of the solid-state cache system.

9. The method of claim 1, wherein designating one or more extents of each dirty mirror pair to be of a particular priority order of at least two priority orders, the at least two priority orders including at least a highest priority order, the highest priority order having a higher relative priority than any other priority order of the at least two priority orders further includes:
designating one or more extents of a particular dirty mirror pair to be of the highest priority order based upon the one or more extents of the particular dirty mirror pair having a block of data contiguous to a block of data of one or more extents of another dirty mirror pair.

10. The method of claim 9, wherein designating one or more extents of each dirty mirror pair to be of a particular priority order of at least two priority orders further includes:
designating one or more extents of a second particular dirty mirror pair to be of a second highest priority order based upon the second particular dirty mirror pair having an overlap of dirty data with another dirty mirror pair.

11. The method of claim 10, wherein designating one or more extents of each dirty mirror pair to be of a particular priority order of at least two priority orders further includes:
designating all other dirty mirror pairs to be of a lowest priority order.

12. The method of claim 1, further comprising:
storing designated priority orders in metadata of the solid-state cache system; and
updating the designated priority orders stored in metadata of the solid-state cache system upon performing the at least one redundancy conversion iteration.

13. The method of claim 1, further comprising:
accumulating one or more writes to a parity extent of a dirty mirror pair until a new write operation needs to update a data extent of the dirty mirror pair; and
performing at least one or more writes to the parity extent of the dirty mirror pair upon performing a new write operation to update the data extent of the dirty mirror pair.

14. The method of claim 1, further comprising:
performing flush operations in a prioritized order, wherein performing each flush operation of the flush operations includes retaining data in the allocated cache and deallocating a parity extent or a mirror pair corresponding to the data in the allocated cache.

15. The method of claim 14, performing flush operations in a prioritized order further comprises:
flushing RAID 5 groups with a frequency of read-modify-write updates greater than a predetermined frequency.

16. The method of claim 14, performing flush operations in a prioritized order further comprises:
   flushing RAID 5 groups with a frequency of read-modify-write updates greater than a predetermined frequency; and
   flushing dirty mirror pairs upon flushing the RAID 5 groups with the frequency of read-modify-write updates greater than the predetermined frequency.

17. The method of claim 14, performing flush operations in a prioritized order further comprises:
   flushing RAID 5 groups with a frequency of read-modify-write updates greater than a predetermined frequency;
   flushing dirty mirror pairs upon flushing the RAID 5 groups with the frequency of read-modify-write updates greater than the predetermined frequency; and
   flushing remaining RAID 5 groups upon flushing the dirty mirror pairs.

18. A solid-state cache system, comprising:
   at least three solid-state storage modules; and
   a controller, the controller configured for:
   designating one or more extents of each dirty mirror pair to be of a particular priority order of at least two priority orders, the at least two priority orders including at least a highest priority order, the highest priority order having a higher relative priority than any other priority order of the at least two priority orders, wherein extents of each dirty mirror pair are stored on different solid-state storage modules of the at least three solid-state storage modules of the solid-state cache system; and
   performing at least one redundancy conversion iteration, wherein performing at least one redundancy conversion iteration includes:
      converting extents of at least two dirty mirror pairs stored on different solid-state storage modules of the at least three solid-state storage modules into at least one redundant array of independent disks (RAID) 5 group and at least one unconverted extent, the extents of the at least two dirty mirror pairs including extents designated to be of a highest remaining priority order, wherein the RAID 5 group is stored across three or more different solid-state storage modules of the at least three solid-state storage modules; and
      deallocating the at least one unconverted extent into at least one unallocated extent, wherein the at least one unallocated extent is available for further caching.

19. The solid-state cache system of claim 18, wherein the at least three solid-state storage modules comprise at least three flash modules.

20. A solid-state cache system, comprising:
   at least four solid-state storage modules; and
   a controller, the controller configured for:
   designating one or more extents of each dirty mirror pair to be of a particular priority order of at least two priority orders, the at least two priority orders including at least a highest priority order, the highest priority order having a higher relative priority than any other priority order of the at least two priority orders, wherein extents of each dirty mirror pair are stored on different solid-state storage modules of the at least four solid-state storage modules of the solid-state cache system; and
   performing at least one redundancy conversion iteration, wherein performing at least one redundancy conversion iteration includes:
      converting extents of at least two dirty mirror pairs stored on different solid-state storage modules of the at least four solid-state storage modules into at least one redundant array of independent disks (RAID) 5 group and at least one unconverted extent, the extents of the at least two dirty mirror pairs including extents designated to be of a highest remaining priority order, wherein the RAID 5 group is stored across three or more different solid-state storage modules of the at least four solid-state storage modules; and
      deallocating the at least one unconverted extent into at least one unallocated extent, wherein the at least one unallocated extent is available for further caching.

* * * * *